R. MUDEN.
TAPER BORING TOOL.
APPLICATION FILED NOV. 25, 1919.

1,330,385.

Patented Feb. 10, 1920.

Inventor:
Rochus Muden by
Harry R. Williams
atty.

UNITED STATES PATENT OFFICE.

ROCHUS MUDEN, OF HARTFORD, CONNECTICUT.

TAPER-BORING TOOL.

1,330,385.　　　Specification of Letters Patent.　　Patented Feb. 10, 1920.

Application filed November 25, 1919. Serial No. 340,549.

*To all whom it may concern:*

Be it known that I, ROCHUS MUDEN, citizen of the United States, residing at Hartford, in the county of Hartford and State of Connecticut, have invented a new and useful Improvement in Taper-Boring Tools, of which the following is a specification.

This invention relates to a tool which is more especially adapted for reaming a tapering under-cut in cylindrical holes bored in wood, leather, composition and the like materials.

The object of the invention is to provide a simple and rugged tool of this character having blades that are automatically expanded from the body for making the required tapering under-cut by pressure upon the shank of the tool when the end of the body which carries the blades is inserted into and pressed against the bottom of the hole to be enlarged, an adjustable stop being provided for limiting the amount of expansion of the blades, and a spring being arranged to withdraw the blades when the pressure upon the shank is relieved.

Figure 1:
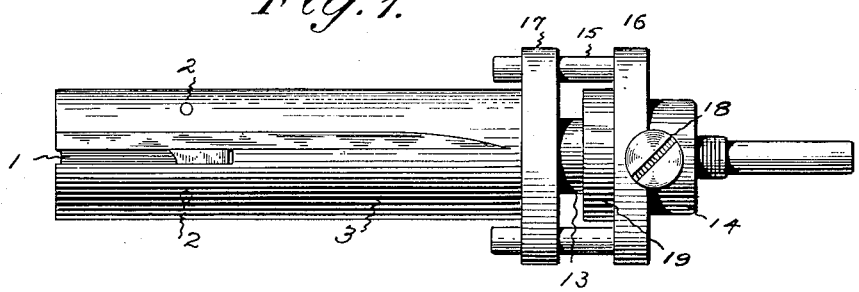
Figure 2:
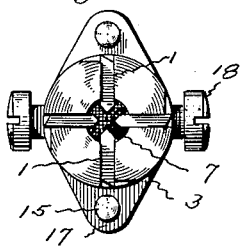
Figure 3:
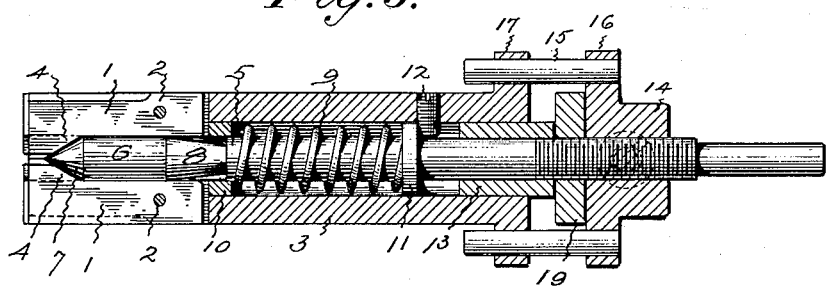
Figure 4:
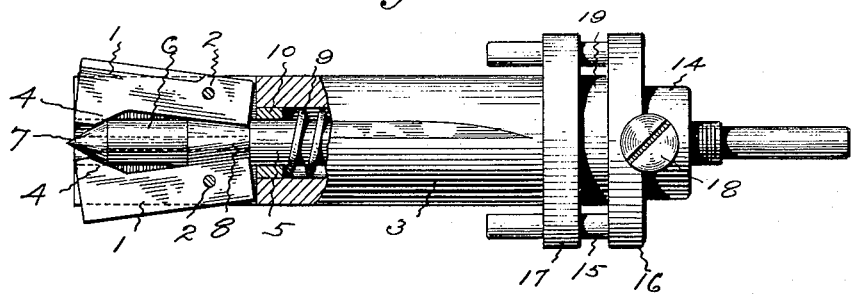

Figure 1 of the accompanying drawings shows a side view of a tool that embodies the invention. Fig. 2 shows an end view of the same. Fig. 3 is a central longitudinal section with the blades in normal closed position. Fig. 4 shows the blades pushed out as when reaming a tapering under-cut in a hole.

In the tool illustrated there are four blades 1, with suitable cutting edges, held by pivots 2 in slots milled in one end of a hollow cylindrical body 3. Each of these blades on its inner edge near the front end has a wedge surface 4. Extending through the body is a plunger 5 that has a head 6 with a tapering end 7 and a tapering neck 8. When the head of the plunger is pressed forward its tapering end engages the wedge surfaces on the inner edges of the blades and swings the blades outwardly so that their cutting edges will extend obliquely beyond the surface of the body. When the plunger head is retracted its tapering neck engages the inner edges of the blades and causes the blades to swing back into the body.

A spiral spring 9 thrusting between a bushing 10 secured in the body and a collar 11 secured on the plunger tends to keep the plunger normally retracted and the blades contracted within the body. A screw stud 12 is set in the body in position to engage the collar and limit the retraction of the plunger, and a guide bushing 13 is loosely located in the body for supporting the shank end of the plunger. A section of the shank of the plunger is threaded, and screwed on this is an adjusting nut 14 that is provided with guide pins 15 which extend from flanges 16 on the sides of the nut loosely through openings in flanges 17 on the sides of the body. Set screws 18 are turned through the adjusting nut against the plunger to retain the nut in the position to which it is adjusted on the plunger, and a lock nut 19 is screwed on the threaded section of the plunger inside of the adjusting nut for further security.

The amount of expansion of the blades is determined by the distance of forward movement of the plunger, and this is regulated by the distance between the face of the lock nut and the end of the body. In use, the shank of the tool is secured in the chuck of the boring apparatus, then when the blade end of the body is thrust into and pressed against the bottom of the hole to be under-cut the plunger is pushed forward and forces the blades outward the required distance to make the tapering under-cut. When this pressure is relieved the spring retracts the plunger and withdraws the blades so that the tool may be removed from the hole.

The invention claimed is:—

1. A taper boring tool having a tubular body, blades pivotally held in slots in one end of the body, pivots securing the blades to the body, a plunger longitudinally movable in the body, said plunger having a shank extending out of the body and a tapering point adapted to engage portions of the free edges of the blades within the body, means independent of the blades connecting the blade carrying body and plunger so the rotation of the plunger will rotate the body and blades, a spring for retracting the plunger, and adjustable means for limiting the forward movement of the plunger into the body when pressed against the thrust of the spring for forcing the free ends of the blades radially outward.

2. A taper boring tool having a tubular body, blades pivotally held in slots in one end of the body, pivots securing the blades to the body, a plunger longitudinally movable in the body, said plunger having a shank extending out of the body and a tapering point adapted to engage edges of the free ends of the blades within the body, means independent of the blades connecting the blade carrying body and plunger so the rotation of the plunger will rotate the body and blades, a spring for retracting the plunger, and adjustable means carried by the plunger and adapted to engage the body for limiting the forward movement of the plunger when it is pressed forward against the thrust of the spring.

3. A taper boring tool having a tubular body, blades pivotally held in slots in one end of the body, pivots securing the blades to the body, a plunger longitudinally movable in the body, said plunger having a shank extending out of the body and a tapering point adapted to engage portions of the free edges of the blades within the body, a bushing in the body and supporting the plunger near its tapered end, a collar on the plunger and guiding the plunger in the body, means independent of the blades connecting the blade carrying body and the plunger so the rotation of the plunger will rotate the body and blades, and a spring for retracting the plunger, thrusting between said bushing and said collar.

4. A taper boring tool having a tubular body, blades pivotally held in slots in one end of the body, pivots securing the blades to the body, a plunger longitudinally movable in the body, said plunger having a shank extending out of the body and a tapering point adapted to engage portions of the free edges of the blades within the body, means independent of the blades connecting the blade carrying body and plunger so the rotation of the plunger will rotate the body and blades, a spring for retracting the plunger, an adjusting nut threaded upon the plunger and means for securing said nut in the position to which it is adjusted.

5. A taper boring tool comprising a hollow cylindrical body, jaws pivotally mounted in one end of the body, a plunger movable longitudinally through the body, said plunger having a tapering end adapted to engage the edges of the free ends of the jaws, a spring for retracting the plunger, an adjusting nut threaded upon the shank of the plunger, and guiding studs extending from the nut through openings in the body.

6. A taper boring tool having a tubular body, blades pivotally held in slots in one end of the body, pivots securing the blades to the body, a plunger longitudinally movable in the body, said plunger having a shank extending out of the body and a tapering point adapted to engage portions of the free edges of the blades within the body, means independent of the blades connecting the blade carrying body and plunger so the rotation of the plunger will rotate the body and blades, a spring for retracting the plunger, an adjusting nut threaded upon the plunger, and a nut threaded upon the plunger for locking the adjusting nut in position.

7. A taper boring tool comprising a hollow cylindrical body, blades pivotally mounted in one end of the body, a plunger extending through the body, said plunger having a tapering end adapted to engage the inner edges of the free ends of the jaws, a spring on the plunger thrusting between a bushing secured to the body and a collar secured to the plunger, a screw extending through the body back of said collar, a bushing located in the body for supporting the shank end of the plunger, an adjusting nut threaded upon the plunger, set screws for securing the adjusting nut, a nut for locking the adjusting nut, and guide studs extending from the adjusting nut through openings in the body.

ROCHUS MUDEN.